United States Patent
Infante-Lopez

(10) Patent No.: US 11,361,092 B2
(45) Date of Patent: Jun. 14, 2022

(54) CONTEXTUAL ACCESS OF DATA

(71) Applicant: Intel Corporation, Santa Clara, CA (US)

(72) Inventor: Gabriel G. Infante-Lopez, Cordoba (AR)

(73) Assignee: Intel Corporation, Santa Clara, CA (US)

( * ) Notice: Subject to any disclaimer, the term of this patent is extended or adjusted under 35 U.S.C. 154(b) by 1001 days.

(21) Appl. No.: 14/865,556

(22) Filed: Sep. 25, 2015

(65) Prior Publication Data

US 2017/0091470 A1    Mar. 30, 2017

(51) Int. Cl.
| | |
|---|---|
| *G06F 21/62* | (2013.01) |
| *G06F 3/0481* | (2022.01) |
| *H04N 21/462* | (2011.01) |
| *G06Q 50/00* | (2012.01) |
| *G06Q 30/02* | (2012.01) |

(52) U.S. Cl.
CPC ........ *G06F 21/6218* (2013.01); *G06F 3/0481* (2013.01); *G06Q 50/01* (2013.01); *H04N 21/4622* (2013.01); *G06Q 30/0282* (2013.01)

(58) Field of Classification Search
CPC ... G06F 21/6218; G06F 3/0481; G06Q 50/01; G06Q 30/0282; H04N 21/4622
See application file for complete search history.

(56) References Cited

U.S. PATENT DOCUMENTS

| | | | |
|---|---|---|---|
| 2011/0302509 A1 | 12/2011 | Leacock et al. | |
| 2013/0097320 A1 | 4/2013 | Ritter et al. | |
| 2013/0275429 A1 | 10/2013 | York et al. | |
| 2014/0337317 A1 | 11/2014 | Woss et al. | |
| 2014/0351263 A1* | 11/2014 | McConnell | G06F 16/9535 707/748 |
| 2015/0135261 A1* | 5/2015 | Park | H04L 63/102 726/1 |
| 2015/0169758 A1 | 6/2015 | Assom et al. | |
| 2015/0186427 A1* | 7/2015 | Logothetis | G06F 16/9024 707/776 |
| 2016/0203327 A1* | 7/2016 | Akkiraju | G06F 21/6218 707/785 |

FOREIGN PATENT DOCUMENTS

| | | |
|---|---|---|
| EP | 3353687 | 8/2018 |
| WO | 2017052834 | 3/2017 |

OTHER PUBLICATIONS

Infante-Lopez, Gabriel G., U.S. Appl. No. 14/318,015, filed in the USPTO Jun. 27, 2014, US Application, Drawings, and E-Ack Receipt attached (35 pages), not yet published.
Infante-Lopez, Gabriel G., U.S. Appl. No. 14/751,841, filed in the USPTO Jun. 25, 2015, US Application, Drawings, and E-Ack Receipt attached (59 pages), not yet published.

(Continued)

*Primary Examiner* — Albert M Phillips, III
(74) *Attorney, Agent, or Firm* — Schwegman Lundberg & Woessner, P.A.

(57) ABSTRACT

A computing device and method for contextual access, including the computing device to implement a traversal of a property graph of data. The traversal includes using contextual information to determine whether to grant access to vertices of the property graph and to outgoing edges of the vertices.

18 Claims, 8 Drawing Sheets

(56) References Cited

OTHER PUBLICATIONS

International Search Report, PCT Application No. PCT/US2016/046781, date of completion Nov. 23, 2016, 3 pages.
"International Application Serial No. PCT US2016 046781, Written Opinion dated Nov. 23, 2016", 9 pgs.
"International Application Serial No. PCT US2016 046781, International Preliminary Report on Patentability dated Apr. 5, 2018", 11 pgs.
"European Application Serial No. 16849206.4, Extended European Search Report dated Apr. 18, 2019", 11 pgs.
"European Application Serial No. 16849206.4, Response filed Nov. 18, 2019 to Extended European Search Report dated Apr. 18, 2019", 23 pgs.
"European Application Serial No. 16849206.4, Communication Pursuant to Article 94(3) EPC dated May 10, 2021", 10 pgs.
"European Application Serial No. 16849206.4, Response filed Aug. 26, 2021 to Communication Pursuant to Article 94(3) EPC dated May 10, 2021", 24 pgs.

\* cited by examiner

210

300

310

400

500

CONTEXTUAL ACCESS OF DATA

TECHNICAL FIELD

The present techniques relate generally to new processing of data. More particularly, the present techniques relate to contextual access of data.

BACKGROUND

The competitive business of data and computing services drives manufacturers in the continuous improvement of their processes and products in order to lower production costs, deliver reliable service, increase beneficial access and applications of data, and improve user experience. Such may be especially challenging in the "Big Data" era. Big Data is a term used to describe the exponential growth and availability of data, both structured and unstructured. Big Data may be a term for collection of data sets so large and complex that processing is difficult using traditional data processing applications. Big Data may also mean that the amount or size of data is larger than the memory capacity or storage capacity of a single machine and, hence, multiple machines (e.g., servers or computers) are used to process the data or solve the problem.

Thus, Big Data is not a longstanding economic practice nor an old commercial practice, and has required major technological advancements unique to computers. While vast amounts of information have always existed, Big Data and its particular issues did not exist in the pre-computer world nor even in the computer world until recently. The availability, collection, and storage of such massive amounts of data were not understood or predicted before computers or even in traditional data processing. The handling, implementation, and applications of Big Data are inextricably tied to computer systems. For instance, graph operations of Big Data were not fathomable, much less implemented, prior to the computer era. Moreover, such graph operations are application-specific and oriented in new unforeseen use cases for industry, science, government, and so forth.

A graph G may consist of at least two types of elements, namely vertices and edges. Every edge generally has two endpoints in the set of vertices, and is said to connect or join the two endpoints. An edge can thus be defined as a set of two vertices (or an ordered pair, in the case of a directed graph). The two endpoints of an edge are also said to be adjacent to each other.

With the advent of Big Data, challenges include technological aspects associated with analysis, capture, curation, search, sharing, storage, transfer, visualization, and so on. Again, there exists a need for continuous improvement in efficiency of data storage and processing, and user experience with respect to data handling, including with regard to large amounts of data such as Big Data and data system configurations.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
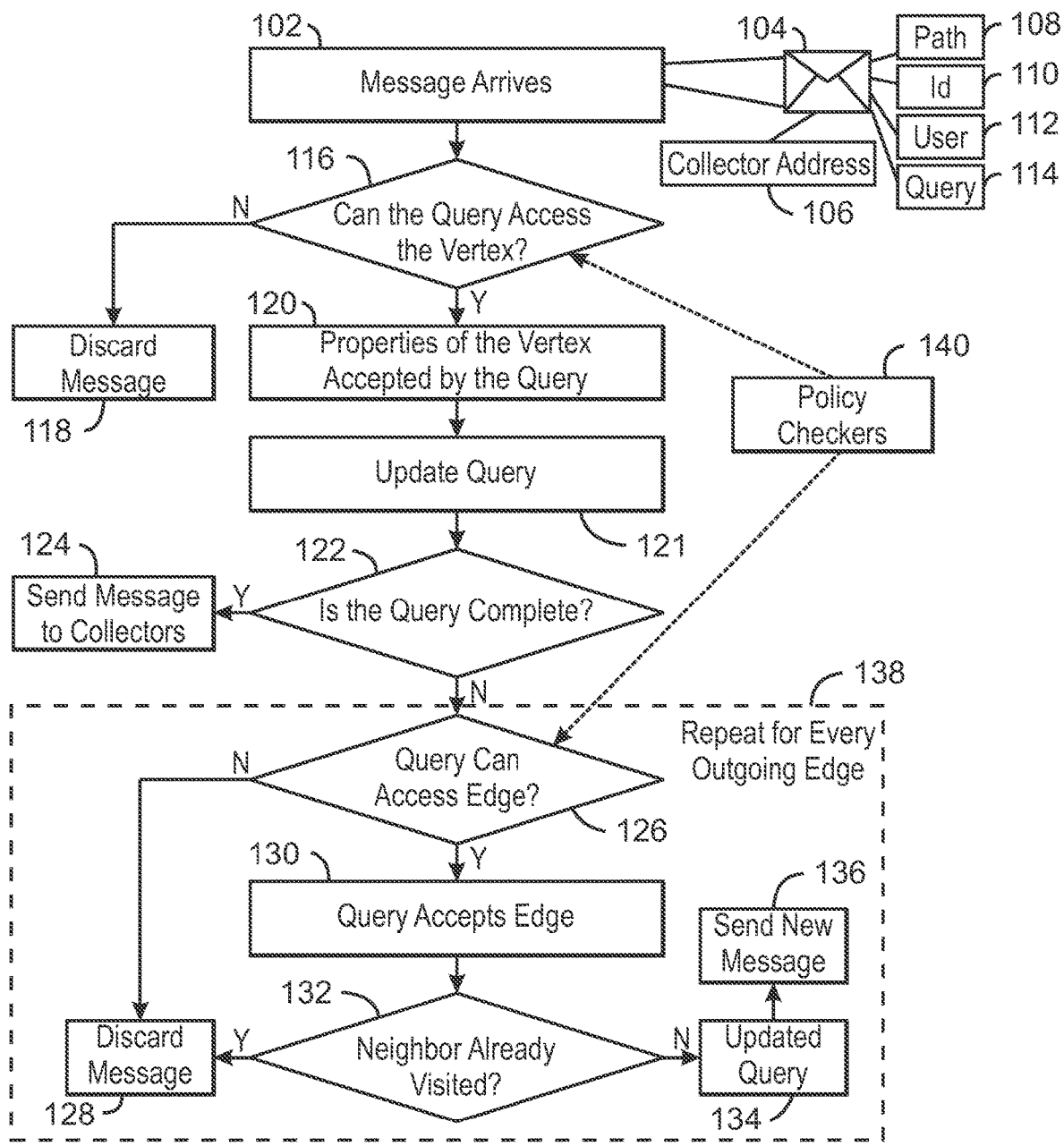
FIG. 1 is a flow chart for an example method of processing performed via vertices in accordance with embodiments of the present techniques.

Privacy, legal, policy, regulatory, and compliance constraints may impede enterprises from realizing some potential of Big Data. Organizations may have difficulty bringing together all of their data onto a single Big Data platform for analysis because of security concerns and other concerns. This may lead to the creating of "data silos" where certain types of data are segmented and not available for analysis. The problem may be compounded by "Lowest Common Denominator" approaches to security, where less sensitive data is over-protected and under-analyzed because it is swept into data silos with more sensitive data. Mining or traversing data across silos may become problematic, resulting in loss of potential use cases. In general, mining can problematic in organizations or businesses where information cannot be mixed.

In response, embodiments herein provide for new access techniques including contextual security access of the data. The implementation may be advantageous to business where information cannot be mixed and/or that benefit from new access techniques and policy. The Internet of Things (IoT) is an example of a domain that may benefit. Applications include graph technology and graph data traversal, cell access information, contextual Information, security, social networking, IoT including sensor data, and so forth. Implementations may be based, for example, on an actor model (e.g., using message passing) in the controlled access to information. Uses cases include social graphs in social media applications, and for graphs in other applications.

As for contextual access, the implementation may sit atop, for example, graph traversals or message passing, and other forms of data processing and storage. Indeed, while the procedure or implementation for contextual access may sit atop traversal procedures for graph databases implemented using, for example, message passing, the contextual access may also be implemented in other graph operations, in table operations, in Structured Query Language (SQL) processing, and so on. With respect to graph traversal via message passing, a metaphor or analogy may be that messages flow through the information graph like a fluid in a network. The messages may collect information and data through the information graph or property graph. Message-passing graph traversal may generally be implemented herein with embodiments.

Contextual security may protect data by restricting this message flow based on where the message has been and where the message is attempting to go. The techniques may support many different security-use cases by employing access control with multiple parameters. Such parameters may include the owner of the query (who is trying to get access to the information), the owner of the data (the data to be accessed), the data the query has already seen, where the data is intended to go, and so forth. As discussed below with respect to graph operations, data ownership may be granular at the level of vertices and edges, typically called cell level access.

Some examples provide compartmentalized and contextual access to information. Contextual access to information may refer to a view on security access that not only takes into consideration the user and the information or data itself but also information the user has already accessed. This parameterization may make an increased range of use cases possible. Such use cases may be within social media applications and recommendation engines, as well as other applications including Big Data exploration, enhanced customer views, security intelligence, operations analysis, data warehousing, healthcare, insurance, travel, gaming, predictive maintenance, energy management, detecting fraud, electronic commerce, retail/customer applications, financial services, digital media, predictive search, government applications, utility supply, telecommunications, and so on. A use case may be composed of a set of possible sequences of interactions between systems and users in a particular environment and related to a particular goal.

In general, graphs can be used to model relations and processes in physical, biological, social, and information systems, and so forth. Indeed, practical implementations are represented by graphs. Graphs may be used to represent networks of communication, data organization, computational devices, the flow of computation, etc. For instance, the link structure of a website can be represented by a directed graph, in which the vertices represent web pages and directed edges represent links from one page to another. A similar approach can be taken to problems in travel, biology, computer chip design, social media, web services, recommendation engines, chemistry, physics, sociology, and many other fields. In general, the techniques include querying of graph-structured data. Furthermore, the graph structure can be extended by assigning a weight to edges of the graph. Graphs with weights, or weighted graphs, may be used to represent structures in which pairwise connections have some numerical values. For example, if a graph represents a road network, the weights could represent the length of each road.

In general, message passing may be related to the actor (e.g., vertex) model of analysis that treats "actors" as the semi-universal or universal primitives of concurrent computation. In response to a message that an actor receives, the actor can make local decisions, create more actors, send more messages, and determine how to respond to the next message received. The actor model may provide both a framework for technical understanding and a basis for several practical implementations of concurrent systems. Moreover, message passing may be a form of communication used in parallel programming and object-oriented programming. Message passing may send a message to a process (e.g., an actor or object) and rely on the process and the supporting infrastructure. As discussed with examples herein, message passing in a traversal (query) of a graph may route a message that includes the path which the message has already traversed, and also the data the message has thus far collected for the query. In some examples, the size of the message may be relatively small as in the range of kilobytes or less than one megabyte. The programming of the messages may be via Java™, Scala™ "regular" language, and so forth.

In sum, embodiments of the present techniques provide for contextual access to data, such as in the query of the data or a traversal of a graph of the data, and so forth. In some examples, the access may be contextual in that new access requested can depend on the data that has been already seen in previous access. Examples include implementing a traversal of a property graph of data, the traversal involving message passing and using contextual information to determine whether to grant access to vertices of the property graph and to outgoing edges of the vertices. The traversal may be a query implemented as messages through the property graph, and wherein a result of the query may be an aggregation of results collected by the messages. The traversal may be a query by a user, and wherein the contextual information for contextual access includes an identity of the user and arriving paths of the query to the vertices. As discussed below, policy checkers may be employed to determine the access of query messages to the vertices and to outgoing edges of the vertices, and the like.

FIG. 1 is a flow chart for an example method 100 of processing performed by vertices (nodes), including with exemplary contextual access. In particular, the method 100 utilizes example policy checkers which their position is depicted in the flow chart. Indeed, the flow chart depicts a view on the processing each vertex may perform, in particular depicting where policy checkers are installed in this illustrated example. In operation, when a message arrives at a vertex, the message may contain information about (1) the path the message has already traversed, (2) the user who issued the query, and other information. The vertex may evaluate the message, such as described in the example FIG. 1, including utilizing the two example policy checkers. The upper or first policy checker checks whether the user or query has access to the vertex itself using as access tokens the path (e.g., arriving path) and the user. If access is granted, then the user query or message is allowed to collect properties or data from the vertex. The second policy checker checks if the query is allowed access to outgoing edges from the vertex. If the query or message is granted access, then the query is allowed access to the properties of the outgoing edge, and the message may be updated with the properties. The policy checkers modulate for contextual access through the property query being traversed by the user and query via message passing, for example. In some examples, the first policy checker checks for contextual security while the second controls where the information can flow in the graph.

At block 102, for a network and storage having data, a message 104 arrives to a vertex of a graph representation of the data. The message 104 may provide a collector address 106, a path 108, an identification (id) 110, a user 112, a query 114, and so forth. The query 114 in the message 104 represents the query being implemented and may include data (if any) the message 104 has already collected. The path 108 may be the arriving path of the message 102 and query 114 to the vertex. The collector address 106 may be the destination of where viable messages 104 and the query 114 collected data are returned. In some examples, this collector address 106 or destination may be utilized as contextual information considered (e.g., by a policy checker) in whether to allow access of the message 102 and query 114 to the vertex and/or to an outgoing edge(s) of the vertex. The id 110 identifies the message 104. Further, the id 110 may be related to the destination (collector address 106), the user 112, and/or the query 114, and the like. The user 112 may be the user who issued the query 114 and/or the owner of the query 114.

As mentioned, the path 108 may be the arriving path of the message 102 and query 114 to the vertex. As discussed below, if permission is granted to access the vertex and if the message 104 accepts properties of the vertex, then the message 104 may be updated. In particular, the message 104 may be updated to append the location of the vertex to the path 108, and to add data collected from the vertex to the query 114. In some examples, the size of the message 102 is relatively small as in the range of kilobytes or less than one megabyte.

In certain examples, a significant aspect may be the message 104 contains the path 108 where the message has traversed already, and this information then used by a policy checker. At block 116, which may be labeled a policy checker, e.g., a first policy checker or vertex policy checker, the policy checker 116 determines if the query 114 can access the vertex based on contextual information such as the path 108 and/or the user 112. If access is not granted, the message 104 may be discarded, as indicated by block 118, because the query 114 via path 108 is not allowed through that vertex. On the other hand, if access is granted and therefore the query 114 is allowed to access the vertex, then at block 120, the properties of the vertex may be accepted by the query. If so accepted, e.g., if one or more of the properties (data) at the vertex are relevant to the query, then at block 121, the query is updated. In particular, the path 108 noted in the message may be updated, i.e., the location of the vertex is appended to the path 108. Similarly, data collected from the vertex is added to the message 104, e.g., added into the query 114. However, if the vertex data is not relevant to the query 114 and thus the message 104, then the message 104 may be discarded.

As mentioned, in order to grant access, the policy checker 116 may check, for example, the previous paths (given by the arriving path 108) and other contextual information. Again, if access is not allowed or if access is allowed but the vertex properties are not accepted by the query, then the message 104 can be discarded. The policy checker as represented by block 116 may determine whether the query 114 can access the vertex based on contextual security or contextual information such as (1) an owner (e.g., user 112) of the query or the user 112 issuing the query, (2) an owner of the data represented by the property graph, (3) data the query has seen prior to reaching the vertex, such as indicated by the path 108 in the arriving message 104 and representing the arriving path(s), and (4) a destination of the data collected by the query, and/or other factors or considerations.

At block 122, the method 100 determines if the query (e.g., query 114) is complete. If yes the query is complete, then at block 124, a message (e.g., updated message 104) is sent to collector(s) such as to the collector address 106. On the other hand, if the query 114 is not complete, the method at block 126 determines if the message 104 and query 114 can access an edge, i.e., an outgoing edge of a given vertex. If no, the message 104 may be discarded, as noted in block 128. If yes the message 104 and query 114 can access an edge, then at block 130, the message 104 and included query 114 may accept the edge properties if relevant. The policy checker as represented by block 126 may determine whether the message 104 and query 114 can access an edge based on (1) an owner of the query, (2) an owner of the data represented by the property graph, (3) data the query has seen prior to reaching the vertex, (4) a destination of the data collected by the query, and/or other factors or considerations.

At block 132, the method determines if a neighbor vertex is already visited. If yes, the message 104 may be discarded, as noted in block 128. If a neighbor vertex is not already visited, then at block 134, the query 114 is updated, and at block 136, a new updated message 104 is sent, such as to a neighbor vertex. In examples, the checking of the neighbor vertex being visited can be eliminated if queries are allowed at that neighbor vertex. Furthermore, as indicated by the dashed line 138, the actions 126 through 136 may be considered and/or repeated for every outgoing edge. Moreover, as discussed, the determinations in blocks 116 or 126 of whether the query can access a vertex or edge, respectively, may be labeled as policy checkers 140.

Figure 2:
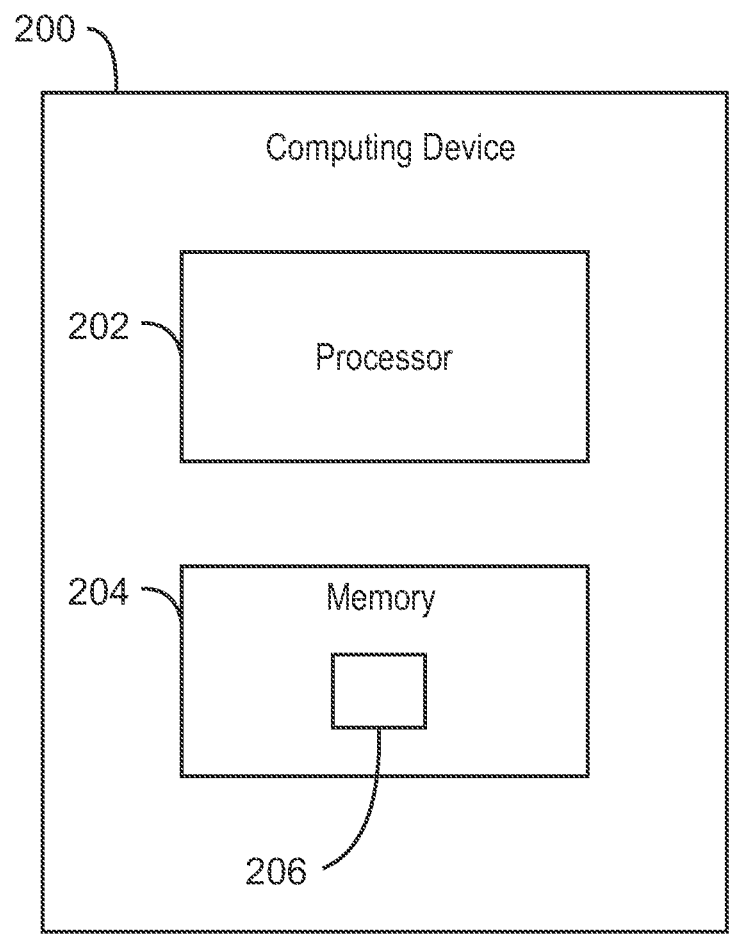
FIG. 2 is a diagram of a computing device for processing data in accordance with embodiments of the present techniques.

FIG. 2 is a diagram of a computing device 200, such as a computing system or server. While FIG. 2 depicts one computing device 200, embodiments may employ multiple computing devices 200. The computing device 200 includes a processor or hardware processor 202 such as a microprocessor, a central processing unit or CPU, and so forth. The processor 202 may be multiple processors and/or each processor 202 may have multiple cores. The computing device 200 has memory 204, such as non-volatile memory (hard drive, read-only-memory or ROM, etc.), volatile memory (e.g., random access memory or RAM, etc.), and other types of memory. In the illustrated example, the memory 204 stores code 206 (e.g., instructions, logic, etc.) executable by the one or more processors 202. The code 206 may be executable by the processor 202 to implement the techniques discussed herein, such as data processing, graph operations, graph traversal, contextual access of data, contextual security, policy checkers in the traversal, implementing a query, recommendation engines, social networking, other applications, and so on. Lastly, while FIG. 2 represents a device 200 such as server, the processor(s) 202 and memory 204 having the stored executable code 206 may instead or additionally be in a distributed computing system such as across multiple compute nodes.

Figure 2A:
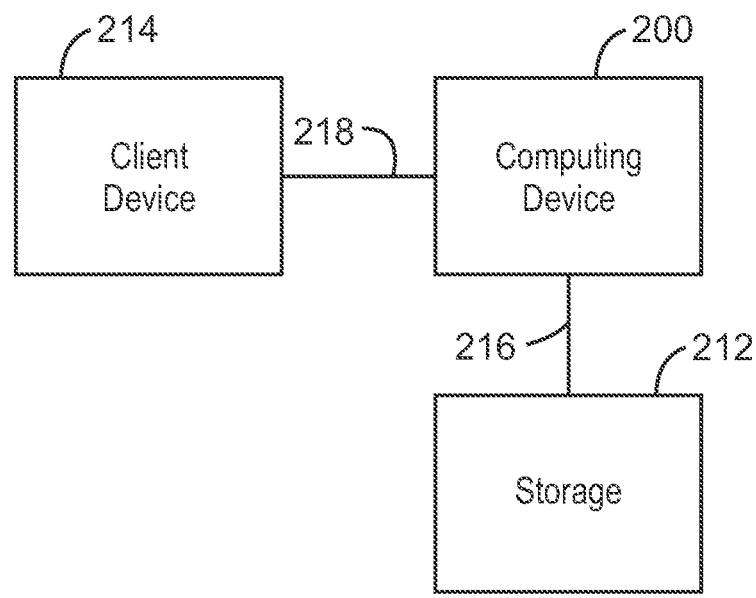
FIG. 2A is a diagram of an arrangement or system employing the computing device of FIG. 1 in accordance with embodiments of the present techniques.

FIG. 2A is an arrangement or system 210 employing the computing device 200 of FIG. 2. As shown in FIG. 2, the computing device 200 includes a processor(s) 202 and memory 204 storing code 206 executable by the processor(s) 202 to perform the techniques described herein such as those related to contextual access in the query of data, and the like. In the illustrated embodiment of FIG. 2A, the arrangement or system 210 may be for various applications or services, such as social media, web services, or other applications. One or more computing devices 200 may function as a server, for instance, in such applications or services.

In the illustrated example, the computing device(s) 200 is coupled to the storage 212 and a client device(s) 214, as indicated by lines 216 and 118, respectively. The lines 216 and 218 may represent a direct connection or networks including local networks, remote networks, the Internet, or any combination thereof, and so on. The storage 212 may include nonvolatile and volatile memory to store data including voluminous amounts of data. The data may be represented as a graph or property graph, and the stored data may queried and/or traversed. Moreover, while the storage 212 is depicted as a single representative box, the storage may include several storage devices including storage devices at different locations. The storage 212 may range from local storage to remote storage including at various geographical locations, or any combinations thereof. The client device(s) 214 that may include a client or user device that desires access to the data stored in the storage 212, such as to initiate or provide a query of the data stored in the storage 212.

A graph may be a general data structure used in different areas and applications. A graph may consist of a finite set of ordered pairs of entities called vertices. An ordered pair may be called an edge. An edge (x,y) is said to point or go from vertex x to vertex y. A graph may also associate properties to each edge in the way of labels or numeric attributes, for example. These properties may represent values for cost, capacity, length, and so on. Graphs may codify different types of information. For example, points of interest (POIs) in a city can be represented as vertices in a graph, while edges connect two POIs if there is a route for traveling from one POI to the other. In such a graph, there might also be more than one edge joining the same pair of POIs. For instance, one edge could represent the time to travel from one POI to another, while another edge could represent the distance in kilometers between the two, and the like. Paths may be useful information encoded in graphs. A path can be a sequence (a1, a2), (a2, a3) . . . (an, an+1) of edges between vertices. Continuing with the POIs example, a path could encode a city tour that visits all the POIs in the graph. A graph can also model other applications such as social networks, and contextual security may play a beneficial role with social networks, recommendation engines, and other applications.

Figure 3:
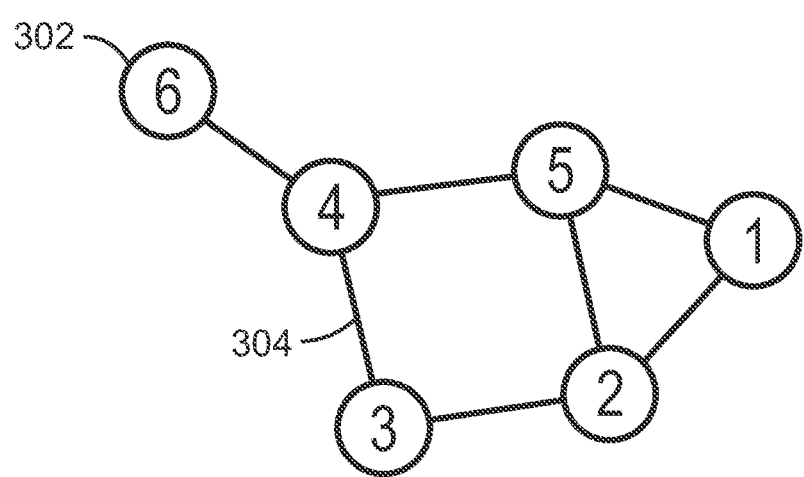
FIG. 3 is a diagram of a undirected graph.

In general, each object in a graph may be called a vertex (or node) in some examples. Edges (or links, arcs, etc.) in a graph join two distinct vertices (nodes). More formally, this graph G can be noted an ordered pair G=(V, E) where V is a set of nodes (vertices), and E is a set of edges (links). Each edge is a pair of vertices. In other words, each element of E is a pair of elements of V. Also, edges can have properties associated to them, and in that sense they are more than just a pair of vertices. In the example of FIG. 3, G=(V,E), where V={1,2,3,4,5,6}, and E={{1,2},{1,5},{2,3}, {2,5},{3,4},{4, 5},{4,6}}. Thus, a graph is a representation of a set of objects where some pairs of objects are connected by links. Again, the interconnected objects are represented by vertices, and the links that connect some pairs of vertices are called edges.

Typically, a graph is depicted in diagrammatic form as a set of dots for the vertices, joined by lines or curves for the edges. The edges may be directed or undirected. For example, if the vertices represent people at a gathering, and there is an edge between two people if they shake hands, then that is an example of an undirected graph, because if person A shook hands with person B, then person B also shook hands with person A. In contrast, if there is an edge from person A to person B when person A knows of person B, then this graph is directed, because knowledge of someone is not necessarily a symmetric relation. In other words, one person knowing another person does not necessarily imply the reverse. For instance, many fans may know of a celebrity, but the celebrity is unlikely to know of all their fans. This latter type of graph may be called a directed graph and the edges called directed edges or arcs. Vertices are also called nodes or points, and edges are also called arcs, links, or lines.

Figure 3A:
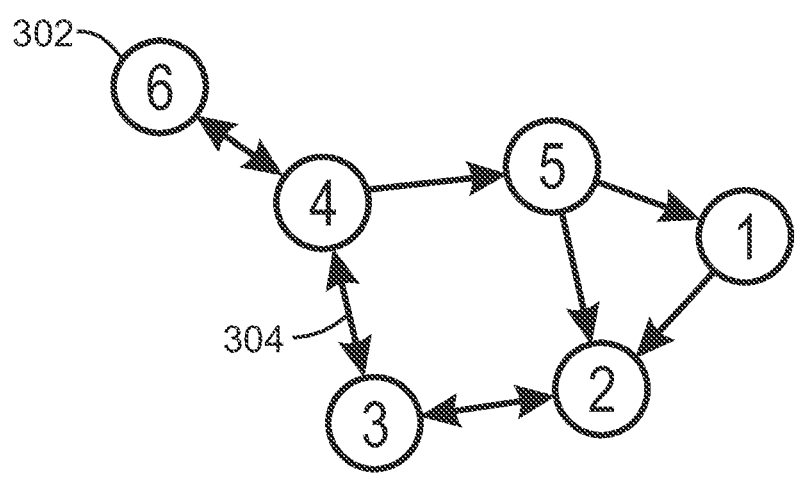
FIG. 3A is a diagram of a directed graph.

FIG. 3 (undirected) and FIG. 3A (directed) are diagrams of exemplary graphs 300 and 310 formats, respectively, for data structures in data processing operations, such as in a data store. A "graph" (e.g., as represented by diagrams 300 and 310) in this context may be made up of vertices 302 or nodes, and lines called edges 304 that connect the vertices 302. A graph may be undirected, as depicted in FIG. 3, meaning that there is no distinction between the two vertices 302 associated with each edge 304. In contrast, the graph may instead be directed, as depicted in FIG. 3A with the lines (representing edges 304) having arrowheads. If so, the edges may be considered as directed from one vertex to another. As mentioned, a graph, G=(V, E) may be a collection of two sets, a set of vertices 302 and a set of edges 304. Graphs may employ properties associated with the vertices and edges. The vertices 302 can represent entities such as people, businesses, accounts, and other items to track. Indeed, properties may be pertinent information that relate to nodes. Again, edges 304 are the lines that connect vertices to vertices and may represent a relationship between the two vertices. Information may be stored in the edges. Meaningful patterns may emerge when one examines the connections and interconnections of vertices, properties, and edges. Compared with relational databases, graph databases may be faster for associative data sets and map more directly to the structure of object-oriented applications. The graphs may be able scale more naturally to large data sets as they typically do not require expensive join operations. As the graph databases may depend less on a rigid schema, the graph databases may be more applicable, for example, to manage ad hoc and changing data with evolving schemas. Moreover, graph databases may be a tool for graph-like queries.

A graph traversal may involve visiting most or all the vertices (nodes) in a graph in a particular manner, and updating and/or checking vertex values along the way. To traverse a graph may be to process most vertices (nodes) or every (vertex) node in the graph once (or at least once). Graph traversal may require that some nodes be visited more than once, since it is not necessarily known before transitioning to a node that the node has already been explored. A variety of approaches may be utilized, such as a depth-first search (DFS), a breadth-first search (BFS), and others. A DFS is technique for traversing a finite graph which the DFS visits the child nodes before visiting the sibling nodes; that is, the depth of any particular path is traversed before exploring breadth. A stack (often the program's call stack via recursion) is generally used when implementing the search. A BFS is another technique for traversing a finite graph and in which a BFS visits the neighbor nodes before visiting the child nodes, and a queue is typically used in the search process. A BFS is sometimes employed to find the shortest path from one node to another.

A property graph may be a type of graph where vertices and edges have labels, and attributes. For example, a social network can be modeled as a property graph where each vertex represents a person with attributes such as name, age, and gender; while an edge between two vertices may represent, for example, friendship, and so on. The friendship edge can have attributes such as date of creation, frequency of interaction, and the like.

Figure 4:
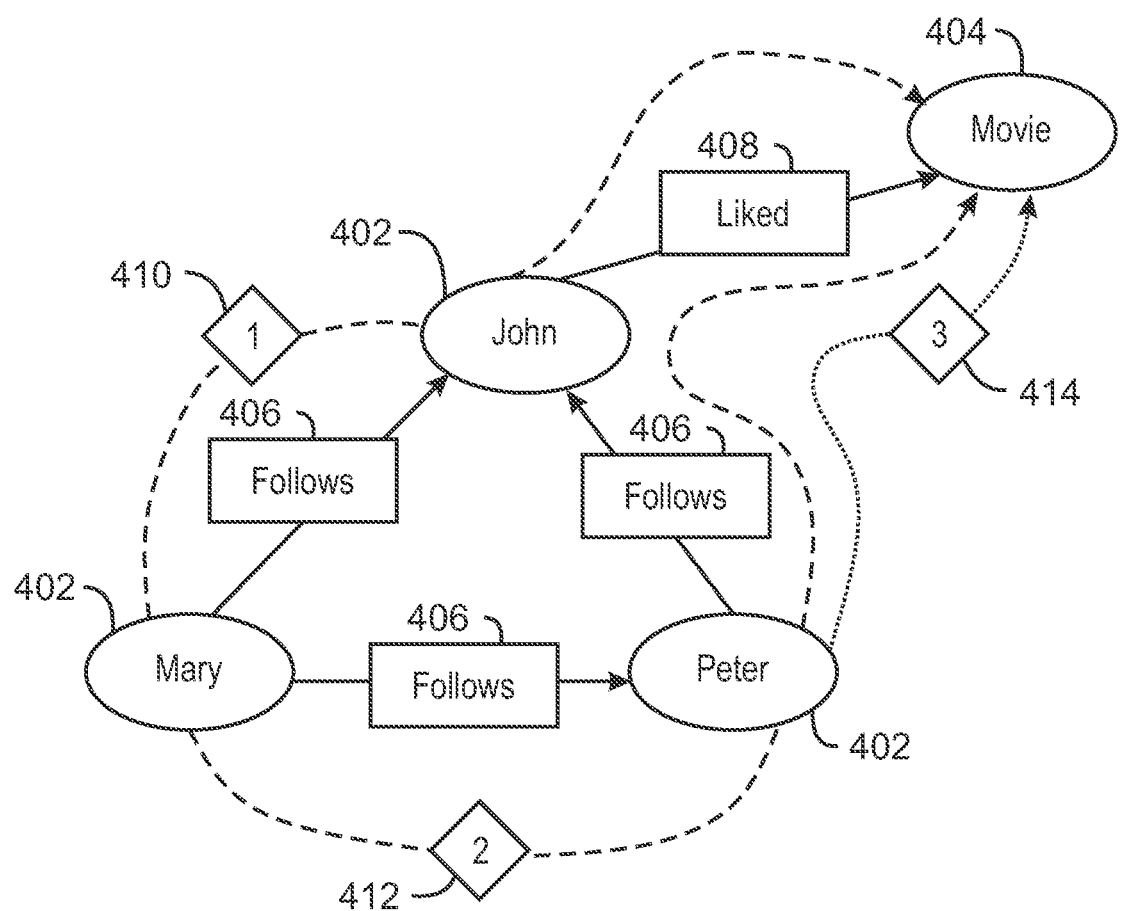
FIG. 4 is a diagram of a simplified social graph in accordance with embodiments of the present techniques.

FIG. 4 is a diagram of a property graph which is a simplified exemplary social graph 400. The graph 400 is a directional graph having three vertices 402 representing individuals Mary, John, and Paul, respectively, and a vertex 404 representing a movie. Thus, the vertices 202 may contain or have information/data (from or in the social media application) of Mary, John, and Paul, respectively. The vertex 404 may include data such as the name and description of the movie, and other data. In this example, the graph 400 has edges 406 representing respectively that Mary follows Peter and John, and that Peter follows John. Therefore, the edge coupling the Mary vertex and Peter vertex has a property of "follows" in the direction from the Mary vertex to the Peter vertex. Likewise, the edge coupling the Mary vertex and John vertex has a property of "follows" in the direction from the Mary vertex to the Peter vertex. The edge coupling the Peter vertex and John vertex has a property of "follows" in the direction from the Peter vertex to the John vertex. Lastly, the depicted edge 408 represents that John posted a like for the particular movie at vertex 404. Thus, the edge 408 coupling the John vertex and the movie vertex 404 has a property of "like" in the direction from the John vertex to the movie vertex 404.

Consider in operation, the example that John wants his like (of the movie) to be only visible to Peter, as John does not want to share this piece of information with Mary. Also, further suppose that the associated social network recommends movies (e.g., via a recommendation engine). The recommendation to a person may be based, for instance, on friend likes of movies. The social network recommending movies may be based on social graphs, and that a recommendation is a path in the graph. In the illustrated example, there are two potential recommendations for Mary: path 1 (labeled as 410) and which is Mary→John→the movie; and path 2 (labeled as 412) which is Mary→Peter→John→movie. On the other hand, for Peter, there is a potential recommendation of path 3 (labeled as 414) and which is Peter→John→movie. Using contextual information and access policies, the network can enforce that paths 1 and 2 are not allowed while path 3 is allowed. In this example, paths 1 and 2 are generally not allowed because the John's like link is not visible to Mary. Path 3 may be allowed because Peter can access all of its edges in this example.

Thus, a query (traversal of the illustrated social property graph) to determine movie recommendations for Mary may implement a message that has permission to flow the outgoing edge from the Mary vertex to the Peter vertex. Yet, the message may not be granted permission to access the "like" data of the movie at the Peter vertex or to flow the outgoing edge from Peter vertex to the movie vertex 404 because of the contextual information that restricts Mary from viewing Peter's "like" of the movie. Also, a construction can be if the message arrives via that path 1 at the movie vertex 404, the movie vertex 404 denies access to the movie data (does not allow the message or query to access the vertex 404 and thus know what is the movie) because the arriving path includes a "like" of the movie by Peter which is restricted from Mary, and so on. Similarly, the path 2 from the Mary vertex through the Peter vertex and then the John vertex would not be granted access to the movie vertex 404 because of the contextual information restricting Mary from viewing Peter's like of the movie. Thus, the query would not return (e.g., to a collector address or recommendation engine) the movie (data) represented at vertex 404 as a recommendation for Mary in this example. However, for path 3, a message of a query flowing from the Peter vertex to the John vertex, and then to the movie vertex 404, would be granted access to the movie vertex 404. This is so in this example because John has allowed Peter to view John's like of the movie. Therefore, based on this contextual information represented by the arriving path, the message would be granted access to the outgoing edge from the John vertex and to the movie vertex 404. Furthermore, the data at the movie vertex 404 would generally be relevant to the query in the example with the query for movie recommendations based on likes of friends (the object of follows).

This simple example indicates that different uses cases are possible to implement. For instance, one scenario may be that paths going through Mary can access John's likes if Mary is not the one firing the query, or a second scenario may state, for instance, that most or all paths that go through Mary cannot access the movie, and so forth. Moreover, the path 3 depicted in FIG. 4 may be a sub path of the path 1 or 2. Such may be an aspect of contextual information. Indeed, "contextual" is not a context free property as it depends on other pieces of information that are actually building the response.

In general, examples herein may use contextual information for granting access to information. Context might depend on the application and may consider (1) the permission a user has to access information, (2) the information the query has already collected, and other considerations. Some examples of the techniques may provide an implementation that models each vertex (node) in the graph with the vertex as a typically independent unit of computation that sends and receives messages. In this setup, information flows in the graph. Queries collect information through the vertices they traverse. Security and access policy may be implemented in vertices and edges to control what information can be accessed, and where the accessed information can go, e.g., the intended destination of the information. In certain examples, because each unit of computation is typically stateless (a graph vertex) and the unit location may be transparent to remaining units (other vertices), the approach may be scalable. Some of the examples may be implemented using, for instance, libraries that support message passing and concurrent execution. These libraries may provide a generally fault tolerant and scalable configuration, facilitating control of relatively large volumes of data.

Traditional databases do not provide such access control to information. Databases like Structured Query Language (SQL) may allow table-based permission while no-SQL databases (e.g., MongoDB®) characteristically provide only collection-level access control. In these SQL and no-SQL system, access control based on context may be generally problematic. In contrast, examples of the present techniques provide for contextual access and may also accommodate the legacy SQL and no-SQL systems.

As described herein, actors may represent vertices in the graph. Actors may be individual units of computation that are generally isolated and independent of other actors. In some examples, actors can live in different processes in the same machine or they can live in a different machine. Vertices send and receive messages and this is the way they can communicate and interact with the rest of the system. These messages may in fact be a pair that consists of a path and a regular expression. For instance, if r is the initial regular expression and (s, p) is a message, then the system may warranty for substantially every path p1 that satisfies s, then the case that p·p1 satisfies r may apply.

When a vertex receives a message, the vertex may modify the message in order to satisfy the previous invariant. Depending on the vertex properties and on the properties of its outgoing edges, the vertex may modify the regular expression and send a new message, for example, with a new regular expression and new prefix path to its neighbors.

As discussed, queries may be implemented as messages in the system. A query might have tens, hundreds, thousands, or millions of messages flowing through the graph. The result of a query may be a final aggregation of the results collected by traveling messages. In some examples, the vertices process messages independently and the vertices may run in parallel.

Figure 5:
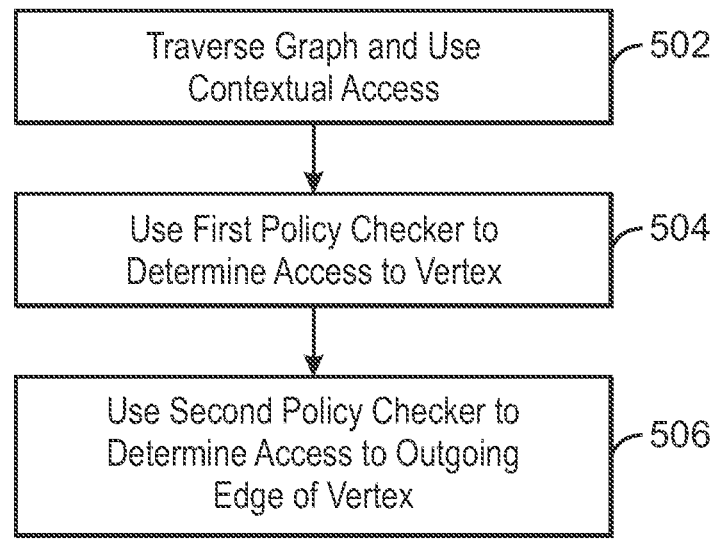
FIG. 5 is a block flow diagram of an example method of processing performed via vertices in accordance with embodiments of the present techniques.

FIG. 5 is an example method 500 of data processing including, for instance, to implement a query. At block 502, the method includes implementing, via a computer system, a traversal of a property graph of data and using contextual access. The property graph may include vertices and edges. The traversal may be for a query and may include message passing. Such a query may involve a message arriving at a vertex, the message including the path the message has already traversed, and the user who issued the query. The traversal may include contextual access via at least a first policy checker and a second policy checker, as noted in blocks 504 and 506, respectively. In some examples, at block 504, the first policy checker determines access to a vertex of the property graph, and at block 506, the second policy checker determines access to an outgoing edge of the vertex.

For some examples of the traversal of the property graph as a query of the data by a user, the first policy checker (block 504) may determine access to the vertex by the query based on the user and on an arriving path of the query to the vertex. In other words, to determine access by the first policy checker may include to determine access to the vertex by the query based on a permission the user has to access the vertex, and based on information the query has collected prior to reaching the vertex. The query or traversal may flow through the graph, and the first policy checker applied by or at most or all vertices. The second policy checkers may be applied by each vertex for applicable outgoing edges of each vertex. Additional policy checkers may be employed.

Figure 6:
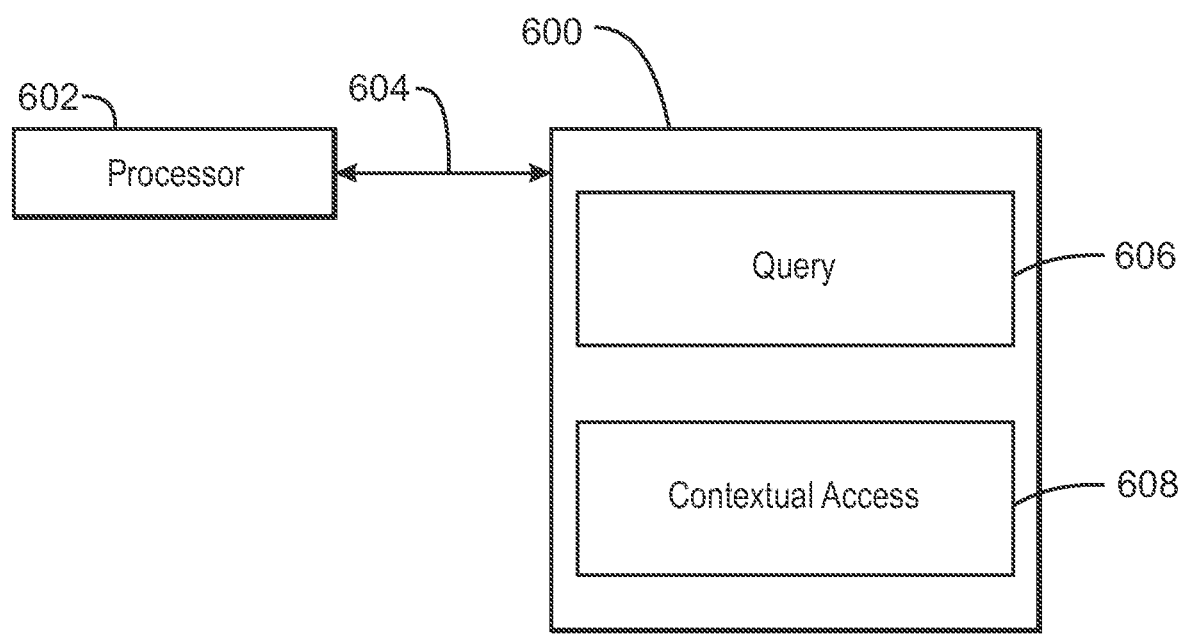
FIG. 6 is a block diagram illustrating a computer-readable medium to facilitate a query and contextual access with data processing and graph operations in accordance with embodiments of the present techniques.

FIG. 6 is a block diagram depicting an example of a tangible non-transitory, computer-readable medium 600 that can facilitate a query and contextual access with data processing and graph operations. The computer-readable medium 600 may be accessed by a processor 602 over a computer interconnect 604. The processor 602 may be a server processor (e.g., 102), a compute node processor, or other processor. The tangible, non-transitory, computer-readable medium 600 may include executable instructions or code to direct the processor 602 to perform the operations of the techniques described herein.

The various software components discussed herein may be stored on the tangible, non-transitory, computer-readable medium 600, as indicated in FIG. 6. For example, a query module 606 (executable code/instructions) may direct the processor 602 to traverse a property graph of data. A contextual module 608 may direct the processor 602 to implement the aforementioned query via contextual access employing, for example, policy checkers. It should be understood that any number of additional software components not shown in FIG. 6 may be included within the tangible, non-transitory, computer-readable medium 600, depending on the application.

In summary, an embodiment includes a computer system or computing device for data processing and contextual access. The computer system has a processor and memory storing code executable by the processor to implement a traversal of a property graph of data. The traversal includes message passing and using contextual information to determine whether to grant access to vertices of the property graph. Further, the traversal uses contextual information to determine whether to grant access to outgoing edges of the vertices. In examples, the property graph models the vertices as independent units of computation that send and receive messages, and wherein the traversal includes a query that collects information through the vertices. The traversal may be a query implemented as messages through the property graph, and wherein a result of the query comprises an aggregation of results collected by the messages. The traversal may be a query by a user, and wherein the contextual information comprises an identity of the user and arriving paths of the query to the vertices. In other words, the contextual information may include a permission the user has to access the vertices, and content the query has collected. Indeed, the traversal may be a query and contextual access performed by the vertices, wherein the contextual information includes an owner of the query, an owner of the data represented by the property graph, data the query has seen, a destination of data collected by the query, and so forth.

Another embodiment includes a computer system (or computing device) having a processor and memory. The memory stores code executable by the processor to implement a traversal of a property graph of data, the traversal including contextual access via a first policy checker and second policy checker, the first policy checker providing contextual security at a vertex of the property graph to determine access to the vertex, and the second policy checker to determine flow of the traversal in the property graph. The contextual access may include using contextual information to determine via the first policy checker whether to grant access to the vertex, and to determine via the second policy checker whether to grant access to an outgoing edge of the vertex. The contextual security by the first policy checker for access to the vertex may include using access tokens for the vertex, the access tokens comprising an arriving path and a user, and wherein the second policy checker to determine access to an outgoing edge of the vertex. Moreover, the traversal of the property graph may be a query of the data by a user, and wherein the traversal may include message passing. In one example, the query collects input for a recommendation engine in a social media application. In operation, the query may include a message arriving at the vertex, the message comprising information about the path the message has already traversed, and the user who issued the query. The contextual security by the first policy checker to determine access to the vertex may include: (1) a permission the user has to access the vertex; and (2) content the query has collected prior to reaching the vertex. In some examples, the vertex represents an actor, wherein the vertex to send and receives message in the traversal, and wherein the vertex to modify a message received and send a new message comprising the modified message to a neighbor vertex. A message arriving at the vertex comprises a collector address, a path, an identification (id), a user, and a query. Lastly, the contextual security may be based on: (1) an owner of the query; (2) an owner of the data represented by the property graph; (3) data the query has seen prior to reaching the vertex; or (4) a destination of data collected by the query, or any combination thereof.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is a computing device for contextual access. The computing device includes a processor; and memory storing code executable by the processor to implement a traversal of a property graph of data, the traversal comprising message passing and using contextual information to determine whether to grant access to vertices of the property graph and to outgoing edges of the vertices.

Example 2 includes the computing device of example 1, including or excluding optional features. In this example, the traversal comprises a query implemented as messages through the property graph, and wherein a result of the query comprises an aggregation of results collected by the messages.

Example 3 includes the computing device of any one of examples 1 to 2, including or excluding optional features. In this example, the traversal comprises a query by a user, and wherein the contextual information comprises an identity of the user and arriving paths of the query to the vertices.

Example 4 includes the computing device of any one of examples 1 to 3, including or excluding optional features. In this example, the traversal comprises a query by a user, and wherein the contextual information comprises: a permission the user has to access the vertices; and content the query has collected.

Example 5 includes the computing device of any one of examples 1 to 4, including or excluding optional features. In this example, the property graph models the vertices as independent units of computation that send and receive messages, and wherein the traversal comprises a query that collects information through the vertices.

Example 6 includes the computing device of any one of examples 1 to 5, including or excluding optional features. In this example, the traversal comprises a query and contextual access performed by the vertices, and wherein the contextual information comprises: an owner of the query; an owner of the data represented by the property graph; data the query has seen; and a destination of data collected by the query.

Example 7 is a computer system for data processing. The computer system includes a processor; and memory storing code executable by the processor to implement a traversal of a property graph of data, the traversal comprising contextual access via a first policy checker and second policy checker, the first policy checker providing contextual security at a vertex of the property graph to determine access to the vertex, and the second policy checker to determine flow of the traversal in the property graph.

Example 8 includes the computer system of example 7, including or excluding optional features. In this example, the contextual access comprises using contextual information to determine via the first policy checker whether to grant access to the vertex and to determine via the second policy checker whether to grant access to an outgoing edge of the vertex.

Example 9 includes the computer system of any one of examples 7 to 8, including or excluding optional features. In this example, the contextual security by the first policy checker for access to the vertex comprises using access tokens for the vertex, the access tokens comprising an arriving path and a user, and wherein the second policy checker to determine access to an outgoing edge of the vertex.

Example 10 includes the computer system of any one of examples 7 to 9, including or excluding optional features. In this example, the traversal of the property graph is a query of the data by a user, and wherein the traversal comprises message passing. Optionally, the query comprises input for a recommendation engine in a social media application. Optionally, the contextual security by the first policy checker to determine access to the vertex comprises: a permission the user has to access the vertex; and content the query has collected prior to reaching the vertex. Optionally, the query comprises a message arriving at the vertex, the message comprising information about a path the message has already traversed, and the user who issued the query.

Example 11 includes the computer system of any one of examples 7 to 10, including or excluding optional features. In this example, the vertex represents an actor, wherein the vertex to send and receives message in the traversal, and wherein the vertex to modify a message received and send a new message comprising the modified message to a neighbor vertex.

Example 12 includes the computer system of any one of examples 7 to 11, including or excluding optional features. In this example, a message arriving at the vertex comprises a collector address, a path, an identification (id), a user, and a query.

Example 13 includes the computer system of any one of examples 7 to 12, including or excluding optional features.

In this example, the traversal comprises a query, and wherein the contextual security is based on: an owner of the query; an owner of the data represented by the property graph; data the query has seen prior to reaching the vertex; and a destination of data collected by the query.

Example 14 is a method of data processing. The method includes implementing, via a computer system, a traversal of a property graph of data, the traversal comprising message passing and contextual access via a first policy checker and a second policy checker, wherein: the first policy checker determining access to a vertex of the property graph; and the second policy checker determining access to an outgoing edge of the vertex.

Example 15 includes the method of example 14, including or excluding optional features. In this example, the traversal of the property graph is a query of the data by a user, and wherein to determine access by the first policy checker comprises to determine access to the vertex by the query based on the user and on an arriving path of the query to the vertex.

Example 16 includes the method of any one of examples 14 to 15, including or excluding optional features. In this example, the traversal of the property graph is a query of the data by a user, wherein to determine access by the first policy checker comprises to determine access to the vertex by the query based on a permission the user has to access the vertex, and based on information the query has collected prior to reaching the vertex.

Example 17 includes the method of any one of examples 14 to 16, including or excluding optional features. In this example, the traversal of the property graph is a query comprising a message arriving at the vertex, the message comprising a path the message has already traversed and a user who issued the query.

Example 18 is a tangible, non-transitory, computer-readable medium. The computer-readable medium includes instructions that direct the processor to implement a traversal of a property graph of data, the traversal comprising message passing and contextual access via a first policy checker and a second policy checker, wherein: the first policy checker to determine access to a vertex of the property graph; and the second policy checker to determine access to an outgoing edge of the vertex.

Example 19 includes the computer-readable medium of example 18, including or excluding optional features. In this example, the traversal of the property graph is a query of the data by a user; to determine access by the first policy checker comprises to determine access to the vertex by the query based on the user and on an arriving path of the query to the vertex; the query is implemented as messages through the property graph; and a result of the query comprises an aggregation of results collected by the messages.

Example 20 includes the computer-readable medium of any one of examples 18 to 19, including or excluding optional features. In this example, the traversal of the property graph is a query of the data by a user, wherein to determine access by the first policy checker comprises to determine access to the vertex by the query based on a permission the user has to access the vertex, and based on information the query has collected prior to reaching the vertex.

Example 21 includes the computer-readable medium of any one of examples 18 to 20, including or excluding optional features. In this example, the query comprises a message arriving at the vertex, the message comprising a path the message has already traversed and a user who issued the query.

Example 22 includes the computer-readable medium of any one of examples 18 to 21, including or excluding optional features. In this example, the traversal comprises a query, and wherein the contextual access is based on: an owner of the query; an owner of the data represented by the property graph; data the query has seen prior to reaching the vertex; and a destination of data collected by the query.

Example 23 includes the computer-readable medium of any one of examples 18 to 22, including or excluding optional features. In this example, the traversal of the property graph is a query of the data by a user, and wherein to determine access by the first policy checker comprises to determine access to the vertex by the query based on the user and on an arriving path of the query to the vertex.

Example 24 includes the computer-readable medium of any one of examples 18 to 23, including or excluding optional features. In this example, the traversal comprises a query implemented as messages through the property graph, and wherein a result of the query comprises an aggregation of results collected by the messages.

Example 25 includes the computer-readable medium of any one of examples 18 to 24, including or excluding optional features. In this example, the traversal comprises a query, and wherein the query comprises input for a recommendation engine in a social media application.

Example 26 is a tangible, non-transitory, computer-readable medium. The computer-readable medium includes instructions that direct the processor to implement a traversal of a property graph of data, the traversal comprising message passing and using contextual information to determine whether to grant access to vertices of the property graph and to outgoing edges of the vertices.

Example 27 includes the computer-readable medium of example 26, including or excluding optional features. In this example, the traversal comprises a query implemented as messages through the property graph, and wherein a result of the query comprises an aggregation of results collected by the messages.

Example 28 includes the computer-readable medium of any one of examples 26 to 27, including or excluding optional features. In this example, the contextual information comprises an identity of the user and arriving paths of the query to the vertices.

Example 29 includes the computer-readable medium of any one of examples 26 to 28, including or excluding optional features. In this example, the traversal comprises a query by a user, and wherein the contextual information comprises: a permission the user has to access the vertices; and content the query has collected.

Example 30 includes the computer-readable medium of any one of examples 26 to 29, including or excluding optional features. In this example, the property graph models the vertices as independent units of computation that send and receive messages, wherein the traversal comprises a query that collects information through the vertices, and wherein the query comprises input for a recommendation engine in a social media application.

Example 31 includes the computer-readable medium of any one of examples 26 to 30, including or excluding optional features. In this example, the traversal comprises a query and contextual access performed by the vertices, and wherein the contextual information comprises: an owner of the query; an owner of the data represented by the property graph; data the query has seen; and a destination of data collected by the query.

Example 32 is a tangible, non-transitory, computer-readable medium. The computer-readable medium includes instructions that direct the processor to implement a traversal of a property graph of data, the traversal including contextual access via a first policy checker and second policy checker, the first policy checker providing contextual security at a vertex of the property graph to determine access to the vertex, and the second policy checker to determine flow of the traversal in the property graph.

Example 33 includes the computer-readable medium of example 32, including or excluding optional features. In this example, the contextual access comprises using contextual information to determine via the first policy checker whether to grant access to the vertex and to determine via the second policy checker whether to grant access to an outgoing edge of the vertex.

Example 34 includes the computer-readable medium of any one of examples 32 to 33, including or excluding optional features. In this example, the contextual security by the first policy checker for access to the vertex comprises using access tokens for the vertex, the access tokens comprising an arriving path and a user, and wherein the second policy checker to determine access to an outgoing edge of the vertex.

Example 35 includes the computer-readable medium of any one of examples 32 to 34, including or excluding optional features. In this example, the traversal of the property graph is a query of the data by a user, and wherein the traversal comprises message passing.

Example 36 includes the computer-readable medium of any one of examples 32 to 35, including or excluding optional features. In this example, the traversal of the property graph is a query, and wherein the query comprises input for a recommendation engine in a social media application.

Example 37 includes the computer-readable medium of any one of examples 32 to 36, including or excluding optional features. In this example, the traversal comprises a query by a user, and wherein the contextual security by the first policy checker to determine access to the vertex comprises: a permission the user has to access the vertex; and content the query has collected prior to reaching the vertex.

Example 38 includes the computer-readable medium of any one of examples 32 to 37, including or excluding optional features. In this example, the traversal comprises a query comprising a message arriving at the vertex, the message comprising information about a path the message has already traversed, and a user who issued the query.

Example 39 includes the computer-readable medium of any one of examples 32 to 38, including or excluding optional features. In this example, the vertex represents an actor, wherein the vertex to send and receives message in the traversal, and wherein the vertex to modify a message received and send a new message comprising the modified message to a neighbor vertex.

Example 40 includes the computer-readable medium of any one of examples 32 to 39, including or excluding optional features. In this example, a message arriving at the vertex comprises a collector address, a path, an identification (id), a user, and a query.

Example 41 includes the computer-readable medium of any one of examples 32 to 40, including or excluding optional features. In this example, the traversal comprises a query, and wherein the contextual security is correlative with an owner of the query, an owner of the data represented by the property graph, data the query has seen prior to reaching the vertex, and a destination of data collected by the query.

Example 42 is a method of data processing. The method includes implementing, via a computer system, a traversal of a property graph of data, wherein the traversal comprises a query of the data by a user and implemented as messages through the property graph, wherein a result of the query comprises an aggregation of results collected by the messages, the traversal comprising contextual access via a first policy checker and a second policy checker, wherein the first policy checker determining access to a vertex of the property graph, and the second policy checker determining access to an outgoing edge of the vertex.

Example 43 includes the method of example 42. In this example, the method includes wherein determining access by the first policy checker comprises determining access to the vertex by the query based on an identity of the user and on an arriving path of the query to the vertex.

Example 44 includes the method of any one of examples 42 to 43, wherein determining access by the first policy checker comprises determining access to the vertex by the query based on a permission the user has to access the vertex, and based on information the query has collected prior to reaching the vertex.

Example 45 includes the method of any one of examples 42 to 44, wherein, the query comprises a message arriving at the vertex, the message comprising the path the message has already traversed, and a user who issued the query.

Example 46 is a method of data processing including contextual access. The method includes implementing via a computing device a traversal of a property graph of data, the traversal including message passing and using contextual information to determine whether to grant access to vertices of the property graph and to outgoing edges of the vertices.

Example 47 includes the method of example 46, wherein the traversal comprises a query implemented as messages through the property graph, and wherein a result of the query comprises an aggregation of results collected by the messages.

Example 48 includes the method of any one of examples 46 to 47, wherein the traversal comprises a query by a user, and wherein the contextual information comprises an identity of the user and arriving paths of the query to the vertices.

Example 49 includes the method of any one of examples 46 to 48, wherein the traversal comprises a query by a user, and wherein the contextual information comprises: a permission the user has to access the vertices; and content the query has collected.

Example 50 includes the method of any one of examples 46 to 49, wherein the property graph models the vertices as independent units of computation that send and receive messages, and wherein the traversal comprises a query that collects information through the vertices.

Example 51 includes the method of any one of examples 46 to 50, wherein the traversal comprises a query and contextual access performed by the vertices, and wherein the contextual information comprises: an owner of the query; an owner of the data represented by the property graph; data the query has seen; and a destination of data collected by the query.

Example 52 is a method of contextual access of data. The method includes implementing via a computing device a traversal of a property graph of data, the traversal comprising contextual access via a first policy checker and second policy checker, the first policy checker providing contextual security at a vertex of the property graph to determine access to the vertex, and the second policy checker to determine flow of the traversal in the property graph.

Example 53 includes the method of example 52, wherein the contextual access comprises using contextual information to determine via the first policy checker whether to grant access to the vertex and to determine via the second policy checker whether to grant access to an outgoing edge of the vertex.

Example 54 includes the method of any one of examples 52 to 53, wherein the contextual security by the first policy checker for access to the vertex comprises using access tokens for the vertex, the access tokens comprising an arriving path and a user, and wherein the second policy checker to determine access to an outgoing edge of the vertex.

Example 55 includes the method of any one of examples 52 to 54, wherein the traversal of the property graph is a query of the data by a user, and wherein the traversal comprises message passing. Optionally, the query comprises input for a recommendation engine in a social media application. Optionally, the contextual security by the first policy checker to determine access to the vertex comprises: a permission the user has to access the vertex; and content the query has collected prior to reaching the vertex. Optionally, the query comprises a message arriving at the vertex, the message comprising information about a path the message has already traversed, and the user who issued the query.

Example 56 includes the method of any one of examples 52 to 55, wherein the vertex represents an actor, wherein the vertex to send and receives message in the traversal, and wherein the vertex to modify a message received and send a new message comprising the modified message to a neighbor vertex.

Example 57 includes the method of any one of examples 52 to 56, wherein a message arriving at the vertex comprises a collector address, a path, an identification (id), a user, and a query.

Example 58 includes the method of any one of examples 52 to 57, wherein the traversal comprises a query, and wherein the contextual security is based on: an owner of the query; an owner of the data represented by the property graph; data the query has seen prior to reaching the vertex; and a destination of data collected by the query.

It is to be understood that specifics in the aforementioned examples may be used anywhere in one or more embodiments. For instance, all optional features of the computing device described above may also be implemented with respect to either of the methods described herein or a computer-readable medium. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A computing device for contextual access, comprising:
a processor; and
memory storing code executable by the processor to implement a traversal of a property graph to collect data for a query, the property graph comprising a plurality of vertices, each vertex associated with information whose access is to be determined by the vertex, the traversal to pass messages pertaining to the query between the vertices of the property graph,
wherein each message comprises a path description to describe a path that the message has traversed through the property graph before arriving at the vertex and a user description to describe a user that issued the query,
wherein to determine whether to grant access to the information associated with the vertex and to outgoing edges of the vertex is based, at least in part, on the path description and the user description, and
wherein upon receiving a message from a previously-traversed neighboring vertex, the vertex to modify the message by amending a regular expression of the message and the path description, the regular expression used to evaluate paths that extend from the path that the message has traversed before arriving at the vertex and the path description modified to reflect paths of outgoing edges, and send a new message comprising the modified message with the amended regular expression and the modified path description to a plurality of neighbor vertices.

2. The computing device of claim 1, wherein a result of the query comprises an aggregation of results collected by the messages.

3. The computing device of claim 1, wherein to determine whether to grant access to the information associated with the vertex and to outgoing edges of the vertex is based, at least in part, on:
a permission the user has to access the vertices; and
content the query has collected.

4. The computing device of claim 1, wherein the property graph models the vertices as independent units of computation that send and receive the messages.

5. The computing device of claim 1, wherein to determine whether to grant access to the information associated with the vertex and to outgoing edges of the vertex is based, at least in part, on:
an owner of the data represented by the property graph;
data the query has seen; and
a destination of data collected by the query.

6. A computer system for data processing, comprising:
a processor; and
memory storing code executable by the processor to implement a traversal of a property graph to collect data for a query, the property graph comprising a plurality of vertices, each vertex associated with information whose access is to be determined by the vertex, the traversal to pass messages pertaining to the query between the vertices of the property graph,
wherein each message comprises a path description to describe a path that the message has traversed through the property graph before arriving at the vertex and a user description to describe a user that issued the query,
wherein each vertex comprises a first policy checker and second policy checker, the first policy checker providing contextual security at the vertex to determine access to the vertex, and the second policy checker to determine flow of the traversal in the property graph, and the code executable by the processor to implement contextual access to the information associated with the vertex based, at least in part, on the path description and the user description, and
wherein upon receiving a message from a previously-traversed neighboring vertex, the vertex to modify the message by amending a regular expression of the message and the path description, the regular expression used to evaluate paths that extend from the path that the message has traversed before arriving at the vertex and the path description modified to reflect paths of outgoing edges, and send a new message comprising the modified message with the amended regular expression and the modified path description to a plurality of neighbor vertices.

7. The computer system of claim 6, wherein the contextual access comprises using the path description and the user description to determine via the first policy checker whether to grant access to the vertex and to determine via the second policy checker whether to grant access to an outgoing edge of the vertex.

8. The computer system of claim 6, wherein the contextual security by the first policy checker for access to the vertex comprises using access tokens for the vertex, the access tokens comprising the path description and the user description, and wherein the second policy checker to determine access to an outgoing edge of the vertex.

9. The computer system of claim 6, wherein the query comprises input for a recommendation engine in a social media application.

10. The computer system of claim 6, wherein the contextual security by the first policy checker to determine access to the vertex comprises:
a permission the user has to access the vertex; and
content the query has collected prior to reaching the vertex.

11. The computer system of claim 6, wherein a message arriving at the vertex comprises a collector address to describe a destination of data collected by the query.

12. The computer system of claim 6, wherein the contextual security is based on:
an owner of the data represented by the property graph;
data the query has seen prior to reaching the vertex; and
a destination of data collected by the query.

13. A method of data processing, comprising:
implementing, via a computer system, a traversal of a property graph to collect data for a query, the property graph comprising a plurality of vertices, each vertex associated with information whose access is to be determined by the vertex, the traversal to pass messages pertaining to the query between the vertices of the property graph,
wherein each message comprises a path description to describe a path that the message has traversed through the property graph before arriving at the vertex and a user description to describe a user that issued the query,
wherein each vertex comprises a first policy checker and a second policy checker, wherein:
the first policy checker determines access to the vertex; and
the second policy checker determines access to an outgoing edge of the vertex;
implementing, via the computer system, contextual access to the information associated with the vertex based, at least in part, on the path description and the user description, and
wherein upon receiving a message from a previously-traversed neighboring vertex, the vertex to modify the message by amending a regular expression of the message and the path description, the regular expression used to evaluate paths that extend from the path that the message has traversed before arriving at the vertex and the path description modified to reflect paths of outgoing edges, and send a new message comprising the modified message with the amended regular expression and the modified path description to a plurality of neighbor vertices.

14. The method of claim 13, wherein determining access by the first policy checker comprises to determine access to the vertex by the query based on a permission the user has to access the vertex, and based on information the query has collected prior to reaching the vertex.

15. A tangible, non-transitory, computer-readable medium comprising code executable by a processor to direct the processor to:
implement a traversal of a property graph to collect data for a query, the property graph comprising a plurality of vertices, each vertex associated with information whose access is to be determined by the vertex, the traversal to pass messages pertaining to the query between the vertices of the property graph,
wherein each message comprises a path description to describe a path that the message has traversed through the property graph before arriving at the vertex and a user description to describe a user that issued the query,
wherein each vertex comprises a first policy checker and a second policy checker, wherein:
the first policy checker to determine access to the vertex; and
the second policy checker to determine access to an outgoing edge of the vertex;
implement contextual access to the information associated with the vertex based, at least in part, on the path description and the user description, and
wherein upon receiving a message from a previously-traversed neighboring vertex, the vertex to modify the message by amending a regular expression of the message and the path description, the regular expression used to evaluate paths that extend from the path that the message has traversed before arriving at the vertex, the path description modified to reflect paths of outgoing edges, and send a new message comprising the modified message with the amended regular expression and the modified path description to a plurality of neighbor vertices.

16. The tangible, non-transitory, computer-readable medium of claim 15, wherein:
a result of the query comprises an aggregation of results collected by the messages.

17. The tangible, non-transitory, computer-readable medium of claim 15, wherein to determine access by the first policy checker comprises to determine access to the vertex by the query based on a permission the user has to access the vertex, and based on information the query has collected prior to reaching the vertex.

18. The tangible, non-transitory, computer-readable medium of claim 15, wherein the contextual access is based on:
an owner of the data represented by the property graph;
data the query has seen prior to reaching the vertex; and
a destination of data collected by the query.

* * * * *